(12) United States Patent
Allen

(10) Patent No.: US 10,300,834 B1
(45) Date of Patent: May 28, 2019

(54) TAILGATE LATCHING SYSTEM

(71) Applicant: Marlon Allen, Haines Junction (CA)

(72) Inventor: Marlon Allen, Haines Junction (CA)

( * ) Notice: Subject to any disclaimer, the term of this patent is extended or adjusted under 35 U.S.C. 154(b) by 63 days.

(21) Appl. No.: 15/710,347

(22) Filed: Sep. 20, 2017

Related U.S. Application Data

(63) Continuation-in-part of application No. 62/398,067, filed on Sep. 22, 2016.

(51) Int. Cl.
*B60P 7/08* (2006.01)

(52) U.S. Cl.
CPC ........... *B60P 7/0807* (2013.01); *B60P 7/0823* (2013.01)

(58) Field of Classification Search
CPC .............................. B60P 7/0807; B60P 7/0823
USPC .................. 410/96–100, 102, 106, 110, 116; 248/499
See application file for complete search history.

(56) References Cited

U.S. PATENT DOCUMENTS

| | | | | |
|---|---|---|---|---|
| 5,011,349 A | * | 4/1991 | McAndrews | A44B 11/25 410/102 |
| 5,433,566 A | * | 7/1995 | Bradley | B60P 7/15 410/106 |
| 5,788,311 A | | 8/1998 | Tibbals | |
| 6,082,801 A | | 7/2000 | Owen et al. | |
| 6,170,724 B1 | | 1/2001 | Carter et al. | |
| 8,182,182 B2 | | 5/2012 | Tardiff et al. | |
| 8,434,978 B2 | * | 5/2013 | Tardif | B60P 7/0807 410/97 |
| 2003/0039534 A1 | | 2/2003 | Radosevich et al. | |
| 2005/0099033 A1 | | 5/2005 | Chverchko et al. | |
| 2012/0313393 A1 | | 12/2012 | Tardiff et al. | |
| 2014/0166830 A1 | | 6/2014 | Billow | |

\* cited by examiner

*Primary Examiner* — Stephen T Gordon
(74) *Attorney, Agent, or Firm* — Cramer Patent & Design, PLLC; Aaron R. Cramer

(57) ABSTRACT

A tailgate latching system includes a pair of latches configured to removably secure to an external latch positioned on either side of a pickup truck tailgate and within the latching mechanisms thereof. A connecting plate has a slot adjacent to each end and is configured to span the distance between each latch while simultaneously being secured about each latch.

17 Claims, 3 Drawing Sheets

TAILGATE LATCHING SYSTEM

RELATED APPLICATIONS

The present invention is a continuation-in-part of and claims the benefit of U.S. Provisional Application No. 62/398,067 filed on Sep. 22, 2016, the entire disclosures of which are incorporated herein by reference.

FIELD OF THE INVENTION

The present invention relates generally to the field of automotive accessories and more specifically relates to tailgate tie-down anchor.

BACKGROUND OF THE INVENTION

A truck's cargo space is often limited by the size of its cargo area or bed. There are some cargo loads that are longer than the cargo area of the truck and it can be difficult to safely secure cargo in the cargo area. Many trucks are equipped with a tailgate at the rear of the cargo area to allow for easy access for the loading and the unloading of cargo. Longer cargo loads are sometimes loaded into a truck with the tailgate in a lowered position which can allow the load to slide out of the bed of the truck while the vehicle is in motion. In an attempt to remedy this condition, any trucks come equipped with several tie-down hooks installed throughout the cargo area to allow the user to strap their cargo into place to prohibit its movement during transit.

Unfortunately, many trucks to do not come factory-equipped with cargo hooks installed into the tailgate section of the truck bed. For cargo loads that would require the tailgate to be left in a lowered position to be transported, there is often some difficulty finding a way to properly and safely tie the load down to prevent it from moving. In order to address the issue of the lack of cargo hooks on the tailgate of trucks, devices have been proposed to provide a means for attaching cargo hooks to the tailgate. Many of these devices suffer from any number of drawbacks.

Many of the proposed devices are very costly and bulky prohibiting their use. Other devices are proposed for specific makes and models of trucks which prohibits the market for those devices. Still other devices are designed so that they modify the cargo area of the truck in a permanent or non-permanent manner, causing reluctance for the truck owner to undertake such modifications. A suitable solution is desired.

Various attempts have been made to solve problems found in automotive accessory art. Among these are found in: U.S. Pat. No. 6,390,744 to Parkins; U.S. Pat. No. 4,229,132 to Taylor; and U.S. Pat. No. 6,695,556 to Addy. These prior art references are representative of automotive accessories.

None of the above inventions and patents, taken either singly or in combination, is seen to describe the invention as claimed. Thus, a need exists for a reliable tailgate tie down anchor, and to avoid the above-mentioned problems.

SUMMARY OF THE INVENTION

The inventor has recognized the aforementioned, inherent problems and lack in the art and observed that there is a need for a new and improved device for such a cargo tie-down device capable of being removably attached to a tailgate of a pickup truck to assist in securing tie-down straps to secure a load that extends past the bed of the pickup truck.

In an embodiment, the disclosed device for securing the tie down straps on the tailgate of a pickup truck would include a first member and a second member. The first member is a generally planar shape with a first side and a second side and has an eye located at upper end and a first engaging member located on the second side. A second member is also generally planar and has a first side with a second engagement member located on it and a second side that is affixed to a bottom of the first member first side. In certain embodiments, a spacer element can be also affixed to the second member second side adjacent to the first member. A connecting plate has a pair of slots located at distal ends thereof. The connecting plate is configured to span the width of the tailgate. When a pair of devices are installed within the tailgate, the connecting plate pair of slots engages over the upper part of the first members.

In another embodiment, the first engagement member is a short rod terminating in a short disc that is capable of engaging a latching mechanism of certain tailgates.

In another embodiment, the second engagement member is an offset bracket that is capable of engaging a latching mechanism of certain other tailgates.

Furthermore, the features and advantages described herein may be combined in various manners and embodiments as one skilled in the relevant art will recognize. The embodiment and examples disclosed herein can be practiced without one (1) or more of the features and advantages described in a particular embodiment or example.

Further advantages of the embodiments and examples disclosed herein will become apparent from a consideration of the drawings and ensuing description.

BRIEF DESCRIPTION OF THE DRAWINGS

The advantages and features of the embodiments and examples disclosed herein will become better understood with reference to the following more detailed description and claims taken in conjunction with the accompanying drawings, in which like elements are identified with like symbols, and in which:

Figure 1:
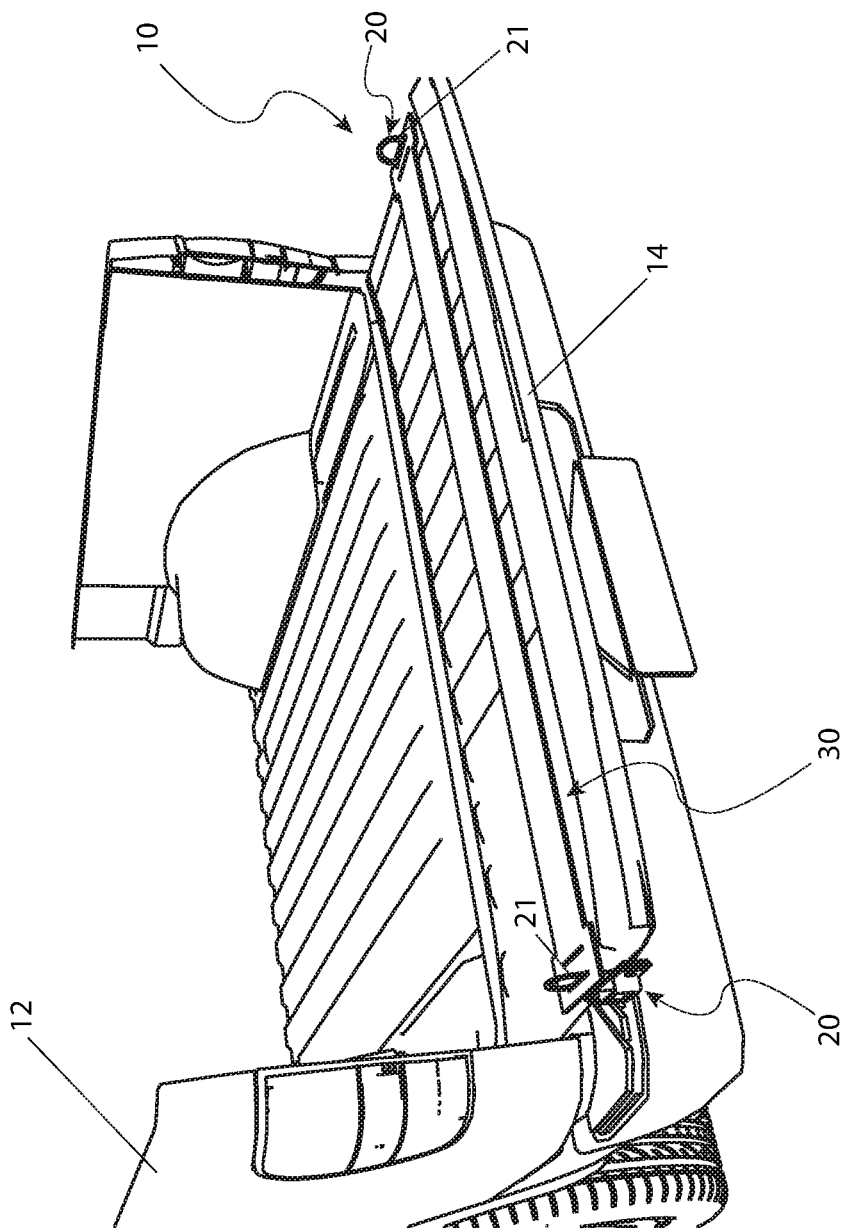
FIG. 1 is an environmental perspective view of a tailgate latching system 10, showing a pair of latches 20 and a connecting plate 30 in an engaged relationship installed on a tailgate 12 of the vehicle 11, according to an embodiment of the present invention.

DESCRIPTIVE KEY 10 tailgate latching system
12 vehicle
14 tailgate
20 latch
21 first member
22 eye
23 short rod
24 offset bracket
25 second member
26 spacer element
30 connecting plate
31 slot 40 load members
45 elastic strap
50 auxiliary tie down

DETAILED DESCRIPTION OF THE PREFERRED EMBODIMENT

The present invention is directed to a tailgate latching system 10. In one (1) embodiment of the present invention, the tailgate latching system 10 may comprise a tailgate tie down anchor. The system 10 may temporarily attach an anchor point for engagement to the existing tailgate latch mechanisms present on the tailgates 14 of vehicles 12, such as most makes and models of pick-up trucks 12.

The system 10 includes a pair of latches 20 and a connecting plate 30. Each latch 20 has a pair of engaging members 23, 24 designed to form a mating relationship with the latching mechanism present on the tailgate 14, depending on the type of latching mechanism present on the specific style of vehicle 12. A connecting plate 30 connects to both latches 20 across the face of the tailgate 14.

Referring now to the drawings, there is shown in FIG. 1 a tailgate latching system (herein described as the "system") 10 during an "in-use" condition. The system 10 incorporates a pair of latches 20 and a connecting plate 30. The pair of latches 20 are each securely latched into an existing latching mechanism of the tailgate 14, providing an anchor point for the attachment of tie-down straps on either side of the tailgate 14.

Figure 2:
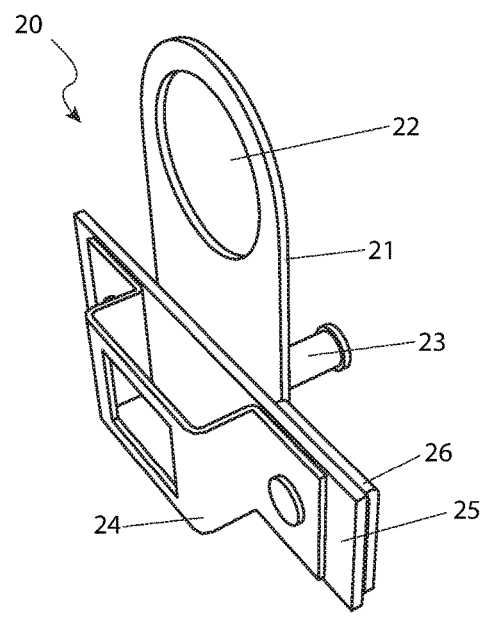
FIG. 2 is a perspective view of a latch 20, according to an embodiment of the present invention.

Referring now to FIG. 2 showing a perspective view of an individual latch 20. The latch 20 has a first member 21 with an eye 22 in the middle adjacent the top, capable of enabling securing of a hook. The first member 21 is generally planar with a curved upper end. A second member 25 has a first side and a second side. The second side of the second member 25 is affixed to the bottom of a first side of the first member 21 and comprises a planar element having distal ends wider than the width of the first member 21. A spacer element 26 of equal thickness to the first member 21 may be affixed to the second side of the second member 25 adjacent the first member 21. The bottom edge of the second member 25, the bottom edge of the first member 21, and the bottom edge of the spacer element 26 be flush.

One (1) of the engaging members is a short rod 23 and is affixed to a second side of the first member 21, towards the bottom thereof. The short rod 23 comprises a shaft that perpendicularly extends away from the bottom of the first member 21 and terminates in a small disc having a diameter substantially larger than that of the shaft. Another one (1) of the engaging members is an offset bracket 24 that is affixed to the first side of the second member 25, opposite the short rod 23. The short rod 23 can securely engage the latching mechanism of certain types of tailgates 14 and the offset bracket 24 has an open bottom that enables secure engagement of other certain types of latching mechanisms. The short rod 23 and offset bracket 24 components are designed such that they will engage in a mating relationship with the female latching component of a tailgate 14, depending on what make or model that is.

Figure 3:
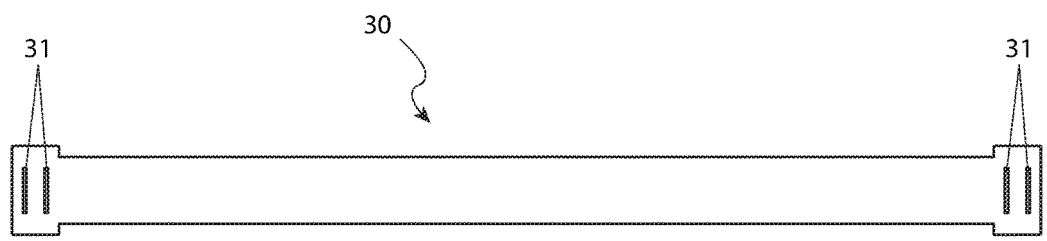
FIG. 3 is a top plan view of the connecting plate 30, according to an embodiment of the present invention; and, FIG. 4 is an environmental perspective view of a tailgate latching system 10, shown in a utilized state, according to an embodiment of the present invention.

Referring now to FIG. 3, a top plan view of the connecting plate 30 is seen. Either distal end of the connecting plate has a width slightly greater than the middle portion, and also has two (2) slots 31 each. The slots 31 are sized to enable the thickness of the upper portion 21 of each latch 20 to pass through, such that the eye 22 is fully exposed. This enables hooks from tie downs to pass over the load that engages the tailgate 14 and secure to the opposing eyes 21 of the latches 20.

Once each latch 20 is secured within the tailgate 12, and the connecting plate 31 is installed over the latches 20 and spans the tailgate 14, the system 10 provides a safe and effective means for tying a cargo load to the tailgate 14 of the vehicle 12 when the tailgate 14 is left in the lowered, horizontal position. The system 10 is easily removable by engaging the tailgate latch release handle and removing the engaging member from the latch.

Figure 4:
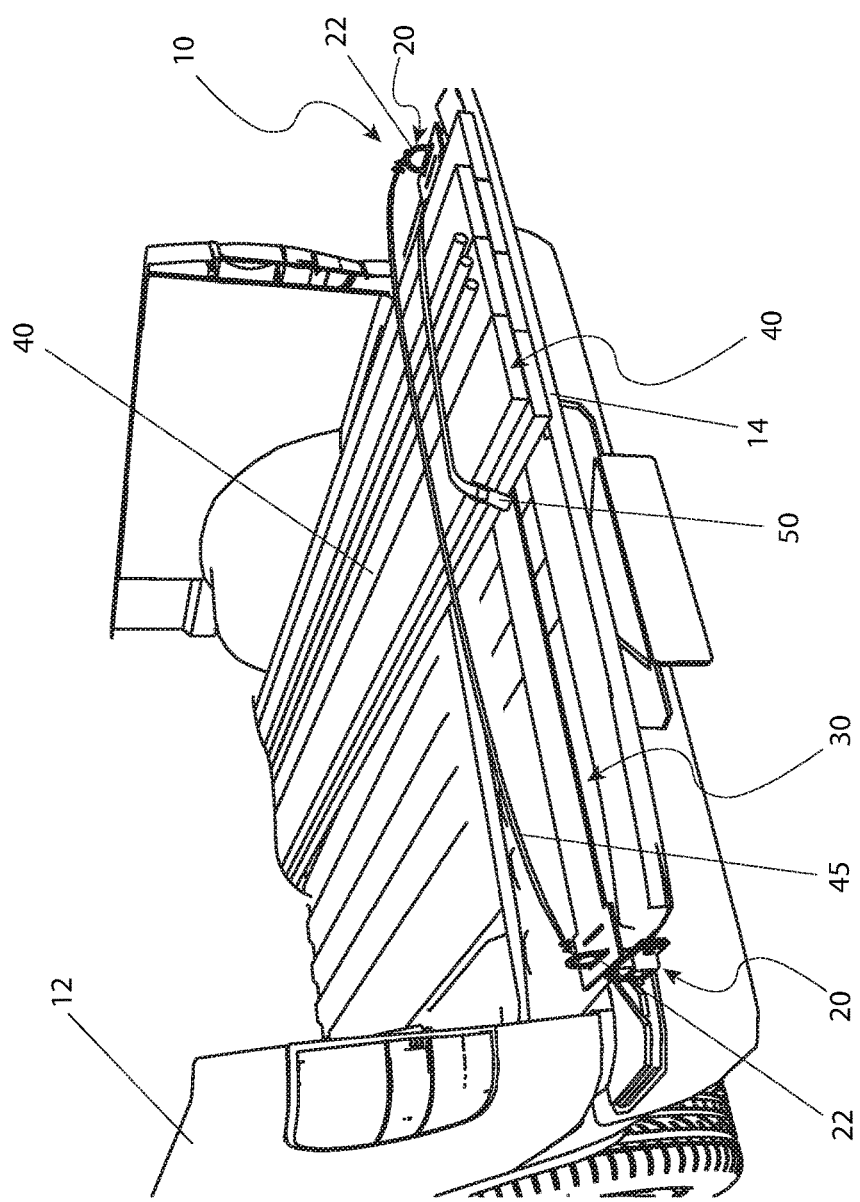

Referring finally to FIG. 4, an environmental perspective view of a tailgate latching system 10, shown in a utilized state is disclosed. A series of load members 40 are placed in the vehicle 12 and extend over the tailgate 14. An elastic strap 45 engages the eye 22 on the latch 20 on each side of the tailgate 14. The elastic strap 45 thus retains the connecting plate in place while also retaining the load members 40. Additionally, should it be deemed necessary, an auxiliary tie-down 50, such as a ratcheting strap, a rope, another elastic strap, a chain, or the like can be used to further engage the load members 40 to prevent movement during transport. The auxiliary tie down 50 physically connects to the connecting plate 30 using a wide variety of connection methods that are well-known in the art. As aforementioned described, the tailgate latching system 10 provides multiple attachment points that are normally not provided on a conventional vehicle 12.

The exact specifications, materials used, and method of use of the system 10 may vary upon manufacturing.

The foregoing descriptions of specific embodiments have been presented for purposes of illustration and description. They are not intended to be exhaustive or to limit to the precise forms disclosed and many modifications and variations are possible in light of the above teachings. The embodiments were chosen and described in order to best explain principles and practical application to enable others skilled in the art to best utilize the various embodiments with various modifications as are suited to the particular use contemplate

What is claimed is:
1. A load securing system, comprising:
a pair of latches, each comprising:
   a first member, having a first side and a second side;
   a second member having a first side and a second side, said second member second side affixed to a bottom of said first member first side;
   an eye located within said first member;
   a first engaging member affixed to said first member; and,
   a second engaging member affixed to said second member; and,
a plate, comprising:
   an elongated central portion;
   a pair of distal end portions, each having a width greater than a width of said central portion; and,
   at least one slot located within each said pair of distal end portions;
wherein either said first or second engaging member of each of said pair of latches is capable of securing to a latching mechanism located on a sidewall of a tailgate of a vehicle;
wherein each slot of said plate is capable of enabling at least a portion of said first member of an individual one of said latches to pass through, said plate capable of abutting a surface of said tailgate; and, wherein said eyes of each of said pair of latches is capable of receiving a securing member of a tie-down thereto.

2. The system of claim 1, wherein said eye is located at a central upper location within said first member.

3. The system of claim 1, wherein said first engaging member is located on said first member second side.

4. The system of claim 3, wherein said first engaging member is a short rod terminating in a small disc.

5. The system of claim 1, wherein said second engaging member is located on said second member first side.

6. The system of claim 5, wherein said second engaging member is an offset bracket.

7. The system of claim 1, wherein said second member is wider than said first member.

8. The system of claim 1, wherein a bottom edge of said first member and a bottom edge of said second member are flush.

9. A load securing system, comprising:
a pair of latches, each comprising:
   a first member, having a first side and a second side;
   a second member having a first side and a second side, said second member second side affixed to a bottom of said first member first side;
   a spacer element, having a first side affixed to said second member second side;
   an eye located within said first member;
   a first engaging member affixed to said first member; and,
   a second engaging member affixed to said second member; and,
a plate, comprising:
   an elongated central portion;
   a pair of distal end portions, each having a width greater than a width of said central portion; and,
   at least one slot located within each said pair of distal end portions;
wherein either said first or second engaging member of each of said pair of latches is capable of securing to a latching mechanism located on a sidewall of a tailgate of a vehicle;
wherein each slot of said plate is capable of enabling at least a portion of said first member of an individual one of said latches to pass through, said plate capable of abutting a surface of said tailgate; and,
wherein said eyes of each of said pair of latches is capable of receiving a securing member of a tie-down thereto.

10. The system of claim 9, wherein said eye is located at a central upper location within said first member.

11. The system of claim 9, wherein said first engaging member is located on said first member second side.

12. The system of claim 11, wherein said first engaging member is a short rod terminating in a small disc.

13. The system of claim 9, wherein said second engaging member is located on said second member first side.

14. The system of claim 13, wherein said second engaging member is an offset bracket.

15. The system of claim 9, wherein said second member is wider than said first member.

16. The system of claim 9, wherein said spacer element is positioned immediately adjacent said first member.

17. The system of claim 16, wherein a bottom edge of said first member, a bottom edge of said second member, and a bottom edge of said spacer element are flush.

\* \* \* \* \*